United States Patent [19]
Kissel

[11] 3,814,935
[45] June 4, 1974

[54] PHOTO-OPTICAL TRANSDUCER
[75] Inventor: William R. Kissel, Taylor, Mich.
[73] Assignee: Chrysler Corporation, Highland Park, Mich.
[22] Filed: Jan. 24, 1973
[21] Appl. No.: 326,330

[52] U.S. Cl............... 250/231 R, 250/206, 250/573
[51] Int. Cl. ........................................... G01d 5/34
[58] Field of Search........ 250/233, 206, 214 R, 232, 250/231 R, 205, 231 SE, 552, 573; 307/311

[56] References Cited
UNITED STATES PATENTS
| | | | |
|---|---|---|---|
| 3,235,742 | 2/1966 | Peters | 250/233 |
| 3,471,700 | 10/1969 | Presti | 250/205 X |
| 3,542,479 | 11/1970 | Sibalis | 250/205 X |
| 3,725,665 | 4/1973 | Talmo | 250/231 SE X |

Primary Examiner—Walter Stolwein
Attorney, Agent, or Firm—Talburtt & Baldwin

[57] ABSTRACT

A photo-optical transducer has a light emitting device energizable from a source of electrical potential through a current controlling element whose impedance is varied by a light activated device regeneratively connected with the current controlling element to vary the current drawn by the transducer between a pair of predetermined levels. The luminous output of the light emitting device is modulated by a condition responsive member, as a flowmeter paddle wheel, which is located in the light path between the light emitting device and the light activated device and is displaced in accordance with a parameter of a physical condition, as fluid flow, being monitored thereby.

5 Claims, 2 Drawing Figures

PHOTO-OPTICAL TRANSDUCER

BACKGROUND

This invention relates to a photo-optical transducer for measuring the rate of displacement of a movable element in response to a parameter of a monitored physical condition causing displacement of said element.

The invention has among its objects to provide a photo-optical transducer which requires a minimum amount of external circuitry for connection of the transducer to an electrical power source and a signal utilization device; which is of simple, efficient and inexpensive construction, utilizing solid state electrical components throughout; and which is possessed of low output impedance, high output sensitivity and noise immunity and rapid response characteristics.

SUMMARY

In accordance with the invention there is provided a two-terminal photo-optical transducer having a light source as a light emitting diode, connected in series with a control transistor and a maximum current level setting load resistor to one side of a potential source. A photo-activated element, as a photo-transistor or diode, whose conductivity is varied by the modulation of the luminous output of the light source by a rotatable element whose frequency or rate of rotation is to be monitored by the transducer, is connected between the control electrode of the control transistor and the other side of the potential source together with a minimum current level setting resistor shunting the phototransistor.

The organization and operation of the invention will be understood from the detailed description of a preferred embodiment of the invention made with reference to the accompanying drawings described below.

DESCRIPTION OF THE PREFERRED EMBODIMENT

Figure 1:
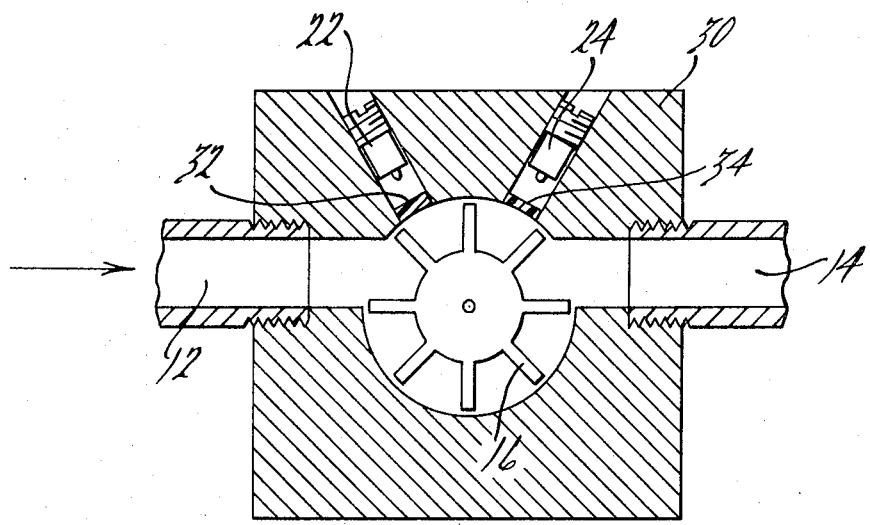
FIG. 1 is a fluid flowmeter in which the invention is applied.
Figure 2:
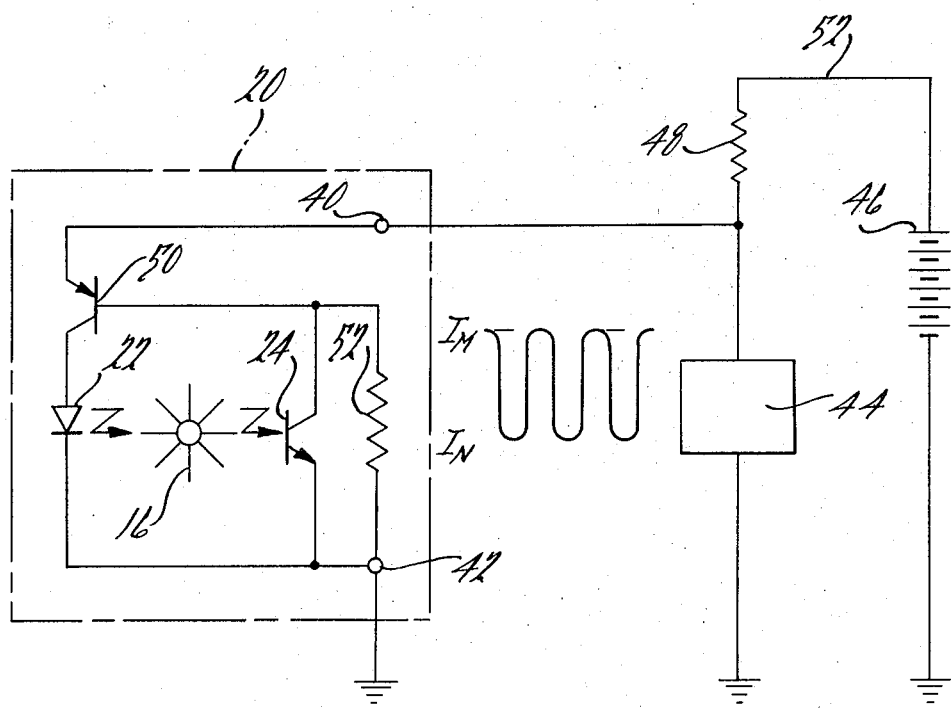
FIG. 2 is an electrical schematic circuit diagram of the structural composition of the apparatus of the invention illustrated in a flowmeter application of FIG. 1.

In the drawings, numberal 10 represents a flowmeter having an inlet 12 and outlet 14 for conduction of fluid flow therethrough past a rotatable shutter, paddle or turbine wheel 16 which is caused to be rotatably displaced by the fluid flow at a rate proportional to the volume of fluid flow through the flowmeter as measured by the associated transducer device 20 of the invention.

The latter includes a light emitting device 22 and a light actuated device 24, which are received in one or more passages provided in the flowmeter housing 30 having translucent windows 32, 34 plugged therein for directing illumination into and out of the housing.

The transducer device 20 has a pair of terminals 40 and 42 by which it is connected over a single wire ground-returned circuit to a signal utilization device 44 and a source of potential 46 shown as grounded at its negative terminal or side whereby the terminal 42 of the transducer 12 may also be connected to reference ground. The other or high potential side of the potential source is shown connected by a conductor 52 to the terminal 40 of the transducer device through a resistor 48, which could be included in the transducer device 20 and is of a relatively low ohmic value, say 100 ohms or so, to limit the maximum current drawn by the device.

Internally, the transducer device comprises an adjustable impedance element 50, which may be a PNP transistor of relatively high amplification characteristics; the light source 22 and photo-detector 24; and a bias or minimum current setting resistor 52. The light source 22, which may be a light emitting diode device, is connected in series with the collector and emitter output electrodes of the control transistor 50 to the terminals 40 and 42 of the transducer device for energization from the potential source 46. Photo-detector 24 may be a photo-sensitive transistor or diode device and is shown connected in shunt with the resistor 52 and between the base electrode of the control transistor 50 and terminal 42 of the transducer device.

Various arrangements and relative locations of the light source and photo-detector may be employed depending upon the character of the rotatable member 16. In the illustrated flowmeter embodiment, the light source and photo-detector are shown located on the same side of the rotatable member 16 where the illumination from the source is reflected from the rotatable member to the photo-detector or sensor element. Alternatively, the light source 22 and photo-detector 24 may be disposed on opposite sides of the movable member, the only consideration being that the sensor element receive illumination from the source as affected or modulated by the intervening rotatable member which is located in the light path between the source and sensor.

In operation, assume that the rotatable member is positioned to exert its maximum influence on the light output from the light generator so that the illumination impinging or incident upon the light sensor is a minimum. In such case, the conductivity of the photoconductive light sensor will be low and its impedance will be high so that the level of the control current flowing into the emitter-base junction of transistor 50 will be low as limited by the relatively high impedance of the parallel circuit combination of the sensor 24 and resistor 52 which may be in the order of 1 megohm or so. Thus, the conductivity of the control transistor 50 will be low to present a high impedance across which is dropped the greater portion of the supply potential appearing across the terminals of the transducer.

As the rotatable member 16 changes its position to decrease its blocking or attenuating effect and thereby increase the illumination incident on the sensor 24, the latter increases its conductivity to increase the emitter-base current draw and therefore the conductivity of the control transistor 50. The latter thus increases the current supplied to the light generator 22 which correspondingly increases its light output intensity to further increase the illumination falling upon the photo-detector. The resulting or total action is of a cumulative or regenerative nature, which places the control transistor in its higher or maximum current conducting condition limited by the magnitude of resistor 48 when the rotatable member 16 is in a position exerting its minimum influence upon the light incident upon the detector 24.

As the member 16 is rotated from its minimum light attenuating or maximum light transmitting position to start to decrease the amount of illumination received by the light sensor, the conductivity of the variably conductive sensor device changes in a decreasing direction and correspondingly reduces the conductivity of the control transistor, which decreases the current supplied to, and, therefore, the intensity of, the lamp 22. This action also is cumulative in effect and rapidly decreases the current drawn by the transducer device appearing as a signal voltage across the terminals 40, 42 of the transducer device or the resistor 48.

The shape as well as the duty cycle of the output signal of the transducer is affected by the shape of the slots, teeth or reflecting areas of the shutter disc or paddle wheel rotatable element and can be made to approximate nearly square waveshapes with rapidly rising and falling wave fronts and trailing portions. The output signal will thus be seen to oscillate or rise and fall between a maximum level $I_M$ and a minimum level $I_N$ established by the ohmic values of the resistors 48 and 52, respectively, and at a rate dependent upon the frequency of rotation of the rotatable element 16. To measure the rate of displacement or frequency of rotation of the element 16, the output signal of the transducer device is supplied to a suitable utilization measuring device as a recorder, counter or frequency or rate meter 44 to record the number of counts or signal pulses per unit of time.

The regenerative action of the circuit enhances the responsiveness and sensitivity of the transducer which is capable of detecting the slightest movement and especially the initiation of any movement of the rotatable element being monitored thereby. The transducer device also exhibits a high immunity to noise and spurious signals by reason of the low output impedance thereof and low circuit impedance presented thereby as connected in parallel with the utilization or measuring device 44 across the series combination of the battery 46 and resistor 48. The equivalent impedance of the circuit is thus less than the 100 ohm impedance of the resistor 48 whereby any capacitive effect picked up externally of the transducer has to be developed across an impedance of less than 100 ohms and would be extremely low rendering the current substantially immune from spurious electrical noise effects.

What is claimed is:

1. Apparatus for monitoring the rate of displacement of an element movable in response to a physical condition causing displacement of said element as a function of a parameter of said condition, said apparatus comprising a direct current source of electrical potential, a controllable adjustable impedance in the form of a linear transistor amplifier device having at least a control terminal and a pair of output terminals, an electrically energizable source of radiant energy connected in series with the output terminals of said adjustable impedance transistor device for energization from said source and emitting radiant energy in the path of displacement of said element for modulation thereby in accordance with the rate of displacement thereof, a variable conductivity radiant energy sensor device for receiving radiant energy modulated by said displaceable element and direct current conductively connected between said control terminal of said adjustable impedance transistor device and one side of said potential source for varying the impedance of said adjustable impedance transistor device, and therefore, the current supplied from said potential source in accordance with the rate of displacement of said element, current setting means connected in shunt with said radiant energy sensor device for setting the minimum current drawn by said apparatus, maximum current limiting means connected in series between the other side of said potential source and one of the output terminals of said adjustable impedance transistor device, and a utilization device connected the said one side of said potential source and the junction between said maximum current limiting means and the said one of the output terminals of said transistor device.

2. Apparatus in accordance with claim 1 wherein said minimum current setting means is of high impedance value relative to said maximum current limiting means.

3. Apparatus in accordance with claim 2 wherein said radiant energy generator is a light emitting device and said radiant energy sensor is a light activated device.

4. Apparatus in accordance with claim 3 wherein said light emitting device is a light emitting diode and said light activated device is a photo-responsive semiconductor device.

5. The combination in accordance with claim 4 wherein said utilization device is a pulse counting device.

* * * * *